Sept. 8, 1925.
F. K. VIAL ET AL
1,553,054
WHEEL
Filed April 25, 1925 2 Sheets-Sheet 1
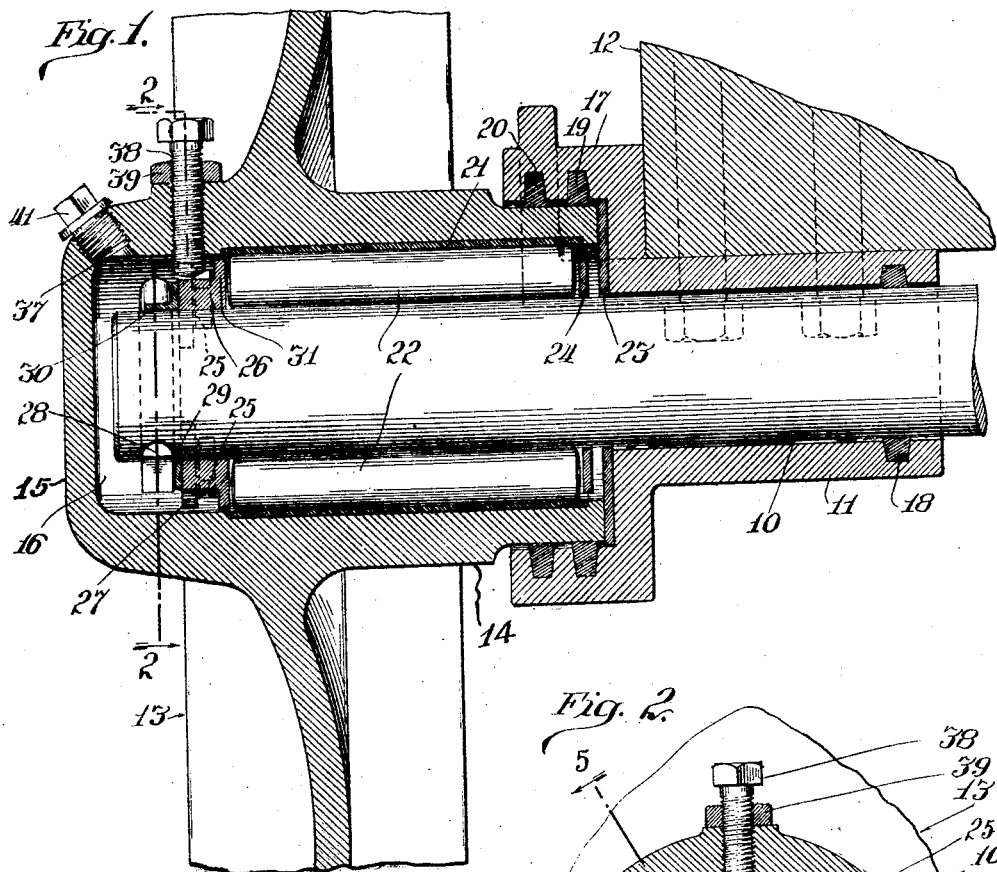
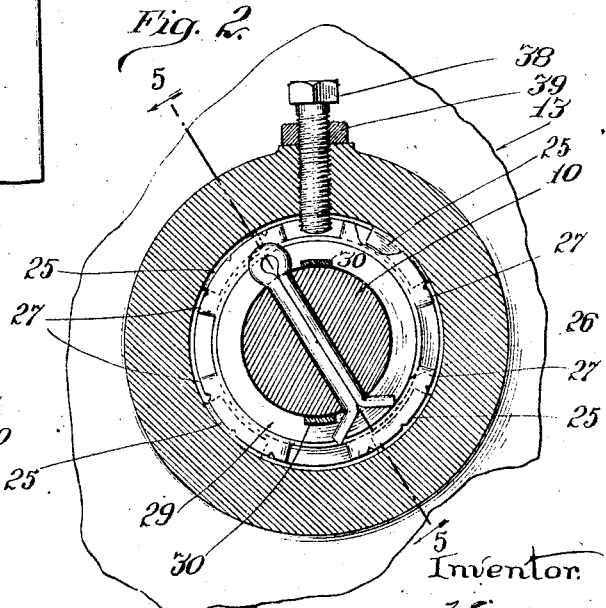
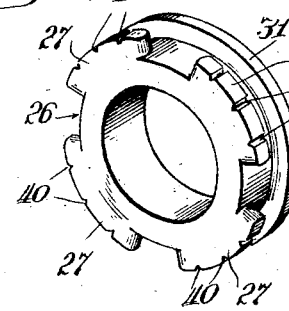
Inventor.
Frederick K. Vial
Evan C. Edwards.
By Barnett Freeman
Attorneys Sept. 8, 1925.
F. K. VIAL ET AL
WHEEL
Filed April 25, 1925
1,553,054
2 Sheets-Sheet 2
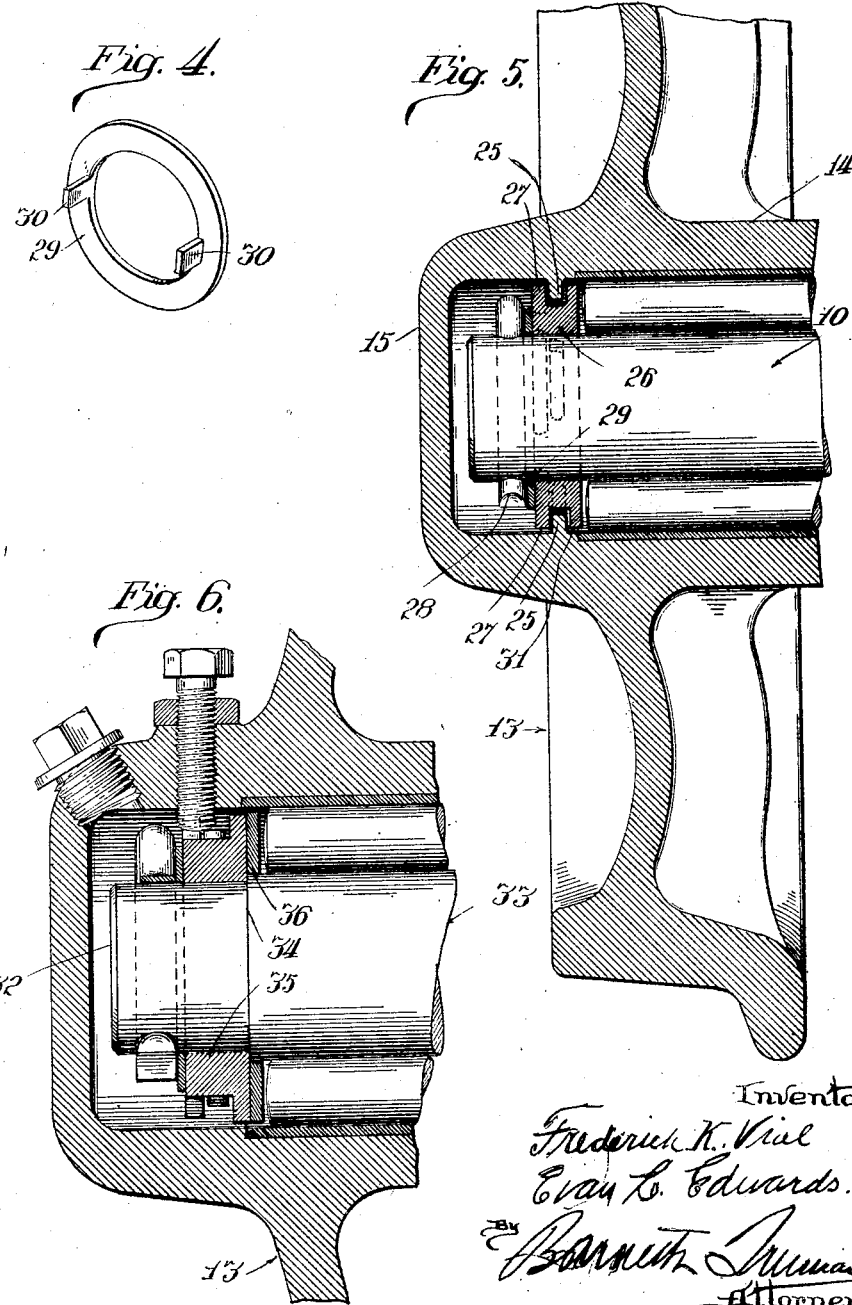

Patented Sept. 8, 1925.

1,553,054

UNITED STATES PATENT OFFICE.

FREDERICK K. VIAL, OF LAGRANGE, AND EVAN C. EDWARDS, OF CHICAGO, ILLINOIS, ASSIGNORS TO GRIFFIN WHEEL COMPANY, OF CHICAGO, ILLINOIS, A CORPORATION OF MASSACHUSETTS.

WHEEL.

Application filed April 25, 1925. Serial No. 25,793.

*To all whom it may concern:*

Be it known that we, FREDERICK K. VIAL and EVAN C. EDWARDS, citizens of the United States, residing at LaGrange and Chicago, respectively, in the county of Cook and State of Illinois, have invented certain new and useful Improvements in Wheels, of which the following is a specification.

This invention relates to wheels, and more particularly to wheels for mine cars or other cars of similar character; although the invention, which is concerned with the means for assembling the wheel and axle, is susceptible of application to other purposes than that indicated.

In wheel assemblies of the type upon which the present invention seeks to improve, the wheel hub has been constructed to provide a lubricant space at the outer end beyond the sleeve or space for the load bearings, this being accomplished customarily by a partition apertured for the end of the axle. The wheel is held in place by a cotter pin, or other fastening device, between which and the partition are interposed washers forming a thrust bearing. In order to permit assembly of wheel and axle the hub may be provided with a removable cap, to be fastened to the hub by screw threads, bolts or cap screws; but it is far more desirable in the interest of economy of manufacture, prevention of leakage of the lubricant and elimination of chance of detachment of the cap and for other reasons, to form the end of the hub, the portion providing the lubricant chamber, integral or structurally unitary with the rest of the hub; but no such construction has been proposed, so far as we are aware, which has not involved undesirable complications and inconveniences in the manufacture and assembly of the parts.

The primary object of our invention is to provide a structurally simple, strong and reliable means for engaging the wheel hub with the axle which will allow the wheel and axle, with the necessary washers and fastening device assembled thereon, to be brought together and locked in proper relation as against longitudinal movement of the wheel on the axle, or the axle with respect to the wheel, by an assembling operation that is very simple and positive and hence capable of being performed conveniently, quickly and by unskilled labor.

Other incidental objects of the invention will be referred to in the following description of the preferred embodiments of the invention shown in the accompanying drawing. In the drawing Fig. 1 is a fragmentary vertical sectional view of the wheel assembly in accordance with one form of our invention.

Fig. 2 is a cross sectional view on line 2—2 of Fig. 1.

Fig. 3 is a view, in perspective, of what will be termed in the specification, the locking element.

Fig. 4 is a similar view of a washer which co-operates with the locking element to provide the thrust bearing above referred to, Fig. 5 is a sectional view on line 5—5 of Fig. 2, and Fig. 6 is a view similar to Fig. 1 illustrating a modification.

Referring first to Figs. 1 to 4 inclusive, 10 designates an axle, shown as an axle of the floating type, which extends through a box 11 secured in any desired manner to the body 12 of the car. The wheel is designated 13, and may be of any desired construction and configuration. It is provided with a hub 14, the end portion 15 of which is preferably formed integral or unitary with the rest of the hub. The box 11 may be formed with a flange 17 overlapping the inner end of the hub and any suitable number of gaskets, as for example the gaskets designated 18, 19 and 20, may be employed for checking the leakage of lubricant from the box.

The load bearings as between hub and axle may be of any desired type. We have shown the hub as provided with a hard metal sleeve 21 between which and the axle are interposed anti-friction rollers 22. A washer 23 is interposed between the box and the hub and a washer 24 between the washer 23 and the roller 22.

It will be understood that the constructions and arrangements above described may be varied as may be found expedient.

In the wheel assembly of our invention no partition intervenes between the space in which the load bearings are placed and the space 16 at the outer end of the hub. Instead the hub is formed integrally with a series of inwardly projecting lugs, shown as four in number, designated 25, which are spaced from each other and from the end of the hub. On the axle 10 is arranged a rotatable locking element 26 (Fig. 3) formed at its outer margin with an equal number of outwardly projecting lugs 27. The locking element may be positioned on the axle as against movement outwardly by any suitable fastening device such as the cotter pin 28 shown in the drawing. Between the locking element 26 and the cotter pin is preferably arranged a washer 29 (Fig. 4) which, with the locking element, forms a thrust bearing as between axle and hub. Preferably the washer 29 is provided with one or more outstanding ears 30 adapted by engagement with the cotter pin to limit the rotation of the washer relative to the axle.

In order to provide an adequate bearing for the outer ends of the rollers 22 the locking element 26 is formed at its inner edge with a flange 31 or a separate washer may be used as indicated in Fig. 5. In Fig. 6 the construction and arrangement of the parts is the same as in the construction shown in Figs. 1 to 4 inclusive, with the exception just noted, and with the further exception that the outer end 32 of the axle 33 is of reduced diameter providing a shoulder 34 against which the locking element 35 may bear, the separate washer, above referred to, being designated 36. By this arrangement the axle is held against end movement in both directions.

In assembling the wheel and axle the locking element 26, washer 29 and cotter pin 28 may be first put in place on the axle, the axle and hub may then be brought together by a longitudinal movement of one relative to the other, with the locking device 26 turned to such position on the axle that lugs 27 will pass through the spaces between the locking lugs 25. The locking device may then be rotated, for example by insertion of a tool through the opening 37 in the upper and outer portion of the hub, so that the lugs 27 will stand in front of the locking lugs 25 on the hub. A holding device is employed for preventing rotation of the locking element from its position of engagement just described. This holding device may consist of a screw 38 extending through the top of the hub so as to project between two of the lugs 27. The screw may be held in place by a lock nut 39. Preferably the edges of the lugs 27 are milled or formed with notches 40 to facilitate the rotary adjustment of locking element by means of the tool inserted through opening 37 as above described. This opening 37 may eventually be closed by plug 41 or by a grease cup.

It will be observed that locking element 26 is, in effect, a washer which, when the parts of the wheel structure are assembled, rotates with the hub while the washer 30 has a non-rotative engagement with the axle, the term "non-rotative" meaning in this connection and in respect to the engagement provided between screw 38 and lugs 27, in capacity to rotate completely so that in effect the element 26 rotates with the hub against washer 29 which has a limited rotative movement only on the axle. These parts 26 and 29 may be made of hardened steel and may be easily renewed when worn.

While the invention has been described in certain preferred embodiments possible modification with respect to structure details are contemplated so that we wish to be understood as claiming the invention broadly within the scope of the appended claims.

We claim:

1. A wheel assembly comprising, in combination, a hub, an axle, a rotatable locking element, locking means on the hub engageable by said locking element by relative movements of rotation as between hub and locking element, and means adapted to hold the locking element against such rotative movements.

2. A wheel assembly comprising, in combination, a hub, an axle, a rotatable locking element on the axle, a fastening device between the locking element and the end of the axle for holding the locking element in place on the axle, locking means on the hub engageable by said locking element by relative movements of rotation as between hub and locking element, and means adapted to hold the locking element against such rotative movements.

3. A wheel assembly comprising, in combination, a hub, an axle, a rotatable locking element on the axle, a fastening device between the locking element and the end of the axle for holding the locking element in place on the axle, locking means on the hub engageable by said locking element by relative movements of rotation as between hub and locking element, means adapted to hold the locking element against such rotative movements, and a washer intervening between said locking element and fastening device.

4. A wheel assembly comprising, in combination, a hub, an axle, a rotatable locking element on the axle, a fastening device between the locking element and the end of the axle for holding the locking element in place on the axle, locking means on the hub engageable by said locking element by relative movements of rotation as between hub and locking element, means adapted to hold the locking element against such rotative movements, and a washer intervening between said locking element and fastening device provided with means for limiting its rotatability relative to the axle.

5. A wheel assembly comprising, in combination, a hub, the outer end of which is unitary with the rest of the hub, an axle, a rotatable locking element, locking means on the hub engageable by said locking element by relative movements of rotation as between hub and locking element, and means adapted to hold the locking elements against such rotative movements.

6. A wheel assembly comprising, in combination, a hub, the outer end of which is unitary with the rest of the hub, and which is provided interiorly with locking means, an axle, a rotatable locking element thereon formed so that through rotative movements of the locking element relative to the axle and a longitudinal movement as between the hub and axle the hub and axle may be brought into operative position and the locking element engaged with said locking means on the hub, and means for preventing rotative movements as between the locking element and hub.

7. A wheel assembly comprising, in combination, a hub the outer end of which is unitary with the rest of the hub and which is provided interiorly with locking means, an axle, a rotatable element thereon, a washer and a fastening device therefor on the axle outwardly of the locking element, said locking element being formed so that through rotative movements of the locking element and a longitudinal movement as between the hub and axle, said axle with the locking element, washer and fastening device may be brought into operative position with respect to the hub and the locking element engaged with the locking means on the hub, and means for preventing rotative movements of the locking element with respect to the hub.

8. In a wheel assembly, the combination of a hub the end of which is unitary with the rest of the hub and provided, interiorly, with locking lugs spaced from each other and away from the end of the hub, an axle, a locking element rotatable on the axle having lugs arranged so that they will pass through the spaces between the locking lugs on the hub and by rotation of the locking element engage the outer faces of said locking lugs, and a holding device adapted to extend through the hub so as to intervene between two of the lugs on the locking element.

9. In a wheel assembly, the combination of a hub the end of which is unitary with the rest of the hub and provided, interiorly, with locking lugs spaced from each other and away from the end of the hub, an axle, a locking element rotatable on the axle having lugs arranged so that they will pass through the spaces between the locking lugs on the hub and by rotation of the locking element engage the outer faces of said locking lugs, a holding device adapted to extend through the hub so as to intervene between two of the lugs on the locking element, and a fastening device extending through the axle outwardly of the locking element.

10. In a wheel assembly, the combination of a hub the end of which is unitary with the rest of the hub and provided, interiorly, with locking lugs spaced from each other and away from the end of the hub, an axle, a locking element rotatable on the axle having lugs arranged so that they will pass through the spaces between the locking lugs on the hub and by rotation of the locking element engage the outer faces of said locking lugs, a holding device adapted to extend through the hub so as to intervene between two of the lugs on the locking element, a fastening device extending through the axle outwardly of the locking element, and a washer between the fastening device and locking element.

11. In a wheel assembly, the combination of a hub the end of which is unitary with the rest of the hub and provided, interiorly, with locking lugs spaced from each other and away from the end of the hub, an axle, a locking element rotatable on the axle having lugs arranged so that they will pass through the spaces between the locking lugs on the hub and by rotation of the locking element engage the outer faces of said locking lugs, a holding device adapted to extend through the hub so as to intervene between two of the lugs on the locking element, a fastening device extending through the axle outwardly of the locking element, and a washer between the fastening device and locking element provided with an outstanding ear to engage the fastening device.

12. In a wheel assembly, the combination of a hub the end of which is unitary with the rest of the hub and provided with an opening and formed, interiorly, with locking lugs spaced from each other and away from the end of the hub and axle, a locking element rotatable on the axle having lugs with outer surfaces notched arranged so that they will pass through spaces between the locking lugs on the hub and by rotation of the locking element engage the outer faces of said locking lugs, and a holding device adapted to extend through the hub so as to intervene between two lugs on the locking element.

13. In a wheel assembly, the combination of a hub the end of which is unitary with the rest of the hub and provided, interiorly, with locking lugs spaced from each other and away from the end of the hub, an axle, a locking element rotatable on the axle having lugs arranged so that they will pass through the spaces between the locking lugs on the hub and by rotation of the locking element engage the outer faces of said locking lugs, a holding device adapted to extend through the hub so as to intervene between two of the lugs on the locking element, antifriction bearing members in the inner portion of the hub, and a washer between said locking element and the anti-friction members.

14. In a wheel assembly, the combination of a hub the end of which is unitary with the rest of the hub and provided, interiorly, with locking lugs spaced from each other and away from the end of the hub, an axle, a locking element rotatable on the axle having lugs arranged so that they will pass through the spaces between the locking lugs on the hub and by rotation of the locking element engage the outer faces of said locking lugs, a holding device adapted to extend through the hub so as to intervene between two of the lugs on the locking element, anti-friction bearing members in the inner portion of the hub, and a washer between said locking element and the anti-friction member which is unitary with the locking element.

15. In a wheel assembly, the combination of a hub having interior locking lugs, an axle, a pair of elements rotatably arranged on the axle, one of which is provided with locking lugs adapted to engage the locking lugs on the hub, and means adapted to prevent rotation of said element having the locking lugs relative to the hub.

16. In a wheel assembly, the combination of a hub having interior locking lugs, an axle, a pair of elements rotatably arranged on the axle, one of which is provided with locking lugs adapted to engage the locking lugs on the hub, and means adapted to prevent rotation of one of said elements relative to the hub and of the other relative to the axle.

17. A wheel assembly comprising, in combination, a hub the end of which is unitary with the rest of the hub, an axle the outer end of which is of smaller diameter than the inner portion providing a shoulder, locking lugs on the inside of the hub, a locking element rotatably arranged on the outer end of the axle to bear against said shoulder, provided with locking lugs to engage the locking lugs on the hub, a fastening device on the axle outwardly of the locking element, and a washer interposed between said locking element and fastening device.

FREDERICK K. VIAL.
EVAN C. EDWARDS.